United States Patent
Solar et al.

(10) Patent No.: US 12,030,501 B2
(45) Date of Patent: Jul. 9, 2024

(54) VEHICULAR CONTROL SYSTEM WITH ENHANCED VEHICLE PASSING MANEUVERING

(71) Applicant: Magna Electronics Inc., Auburn Hills, MI (US)

(72) Inventors: Martin Solar, Erlenbach (DE); Akilesh Sivakumar, Darmstadt (DE)

(73) Assignee: Magna Electronics Inc., Auburn Hills, MI (US)

( * ) Notice: Subject to any disclaimer, the term of this patent is extended or adjusted under 35 U.S.C. 154(b) by 317 days.

(21) Appl. No.: 17/449,539

(22) Filed: Sep. 30, 2021

(65) Prior Publication Data

US 2022/0105941 A1 Apr. 7, 2022

Related U.S. Application Data

(60) Provisional application No. 63/198,197, filed on Oct. 2, 2020.

(51) Int. Cl.
*B60W 30/18* (2012.01)
*B60W 10/04* (2006.01)
(Continued)

(52) U.S. Cl.
CPC ...... *B60W 30/18163* (2013.01); *B60W 10/04* (2013.01); *B60W 10/18* (2013.01);
(Continued)

(58) Field of Classification Search
CPC ...... B60W 10/04; B60W 10/18; B60W 10/20; B60W 2420/42; B60W 2520/10; B60W 2520/12; B60W 2540/215; B60W 2554/4041; B60W 2554/4042; B60W 2554/4043; B60W 2554/4045; B60W 2556/65; B60W 2710/18; B60W 2710/20; B60W 2720/106; B60W 2720/125;
(Continued)

(56) References Cited

U.S. PATENT DOCUMENTS

| 5,550,677 A | 8/1996 | Schofield et al. |
| 5,670,935 A * | 9/1997 | Schofield .......... B60R 21/01538 |
| | | 348/E7.086 |

(Continued)

FOREIGN PATENT DOCUMENTS

IN 201741056955 5/2019

*Primary Examiner* — Babar Sarwar
(74) *Attorney, Agent, or Firm* — HONIGMAN LLP (57) ABSTRACT

A vehicular vision system includes a camera disposed at a vehicle and viewing exterior of the vehicle. The system, responsive to processing by an image processor of image data captured by the camera, determines presence of a leading vehicle ahead of the equipped vehicle and travelling in the same lane as the equipped vehicle. The system, via processing by the image processor of image data captured by the camera, determines an indication at the leading vehicle indicative of a safeness of a passing maneuver by the equipped vehicle. The indication is representative of a determination by the leading vehicle that the safeness of the passing maneuver exceeds a threshold safeness level. The system, based on the determined indication, at least in part controls operation of the equipped vehicle to overtake and pass the determined leading vehicle.

20 Claims, 3 Drawing Sheets

(51) Int. Cl.
*B60W 10/18* (2012.01)
*B60W 10/20* (2006.01)
*B60W 50/14* (2020.01)
*G06V 20/58* (2022.01)
*H04N 25/76* (2023.01)

(52) U.S. Cl.
CPC ............ *B60W 10/20* (2013.01); *B60W 50/14* (2013.01); *G06V 20/584* (2022.01); *B60W 2420/403* (2013.01); *B60W 2520/10* (2013.01); *B60W 2520/12* (2013.01); *B60W 2540/215* (2020.02); *B60W 2554/4041* (2020.02); *B60W 2554/4042* (2020.02); *B60W 2554/4043* (2020.02); *B60W 2554/4045* (2020.02); *B60W 2556/65* (2020.02); *B60W 2710/18* (2013.01); *B60W 2710/20* (2013.01); *B60W 2720/106* (2013.01); *B60W 2720/125* (2013.01); *B60W 2754/30* (2020.02); *H04N 25/76* (2023.01)

(58) Field of Classification Search
CPC ....... B60W 2754/30; B60W 30/18163; B60W 50/14; G06V 20/58; G06V 20/584; H04N 25/76
See application file for complete search history.

(56) References Cited

U.S. PATENT DOCUMENTS

| | | | |
|---|---|---|---|
| 5,949,331 A * | 9/1999 | Schofield | H04N 7/18 348/E7.086 |
| 6,587,186 B2 | 7/2003 | Bamji et al. | |
| 6,674,895 B2 | 1/2004 | Rafii et al. | |
| 6,678,039 B2 | 1/2004 | Charbon | |
| 6,690,268 B2 | 2/2004 | Schofield et al. | |
| 6,690,354 B2 | 2/2004 | Sze | |
| 6,693,517 B2 | 2/2004 | McCarthy et al. | |
| 6,710,770 B2 | 3/2004 | Tomasi et al. | |
| 6,842,687 B2 | 1/2005 | Winner et al. | |
| 6,876,775 B2 | 4/2005 | Torunoglu | |
| 6,906,793 B2 | 6/2005 | Bamji et al. | |
| 6,919,549 B2 | 7/2005 | Bamji et al. | |
| 7,038,577 B2 | 5/2006 | Pawlicki et al. | |
| 7,053,357 B2 | 5/2006 | Schwarte | |
| 7,157,685 B2 | 1/2007 | Bamji et al. | |
| 7,176,438 B2 | 2/2007 | Bamji et al. | |
| 7,203,356 B2 | 4/2007 | Gokturk et al. | |
| 7,205,904 B2 * | 4/2007 | Schofield | G06F 18/24 340/937 |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,580,795 B2 | 8/2009 | McCarthy et al. | |
| 7,720,580 B2 | 5/2010 | Higgins-Luthman | |
| 7,855,755 B2 | 12/2010 | Weller et al. | |
| 8,013,780 B2 | 9/2011 | Lynam | |
| 8,027,029 B2 | 9/2011 | Lu et al. | |
| 9,036,026 B2 | 5/2015 | Dellantoni et al. | |
| 9,146,898 B2 | 9/2015 | Ihlenburg et al. | |
| 9,575,160 B1 | 2/2017 | Davis et al. | |
| 9,599,702 B1 | 3/2017 | Bordes et al. | |
| 9,682,712 B2 | 6/2017 | Kubo | |
| 9,689,967 B1 | 6/2017 | Stark et al. | |
| 9,753,121 B1 | 9/2017 | Davis et al. | |
| 10,071,687 B2 | 9/2018 | Ihlenburg et al. | |
| 10,099,614 B2 | 10/2018 | Diessner | |
| 10,115,314 B2 | 10/2018 | Boegel | |
| 10,214,157 B2 * | 2/2019 | Achenbach | B60R 11/04 |
| 10,222,224 B2 * | 3/2019 | Johnson | G08G 1/205 |
| 10,406,981 B2 * | 9/2019 | Chundrlik, Jr. | G01S 19/45 |
| 10,457,209 B2 * | 10/2019 | Byrne | B60R 1/00 |
| 10,787,125 B2 * | 9/2020 | Achenbach | H04N 23/57 |
| 10,812,992 B1 * | 10/2020 | Tran | H04B 7/0617 |
| 11,017,665 B1 * | 5/2021 | Roy | G08G 1/16 |
| 11,454,719 B2 | 9/2022 | Hess et al. | |
| 11,763,410 B1 * | 9/2023 | Roy | B60W 60/001 701/117 |
| 2005/0179527 A1 * | 8/2005 | Schofield | B60R 1/00 348/148 |
| 2008/0192984 A1 * | 8/2008 | Higuchi | G06V 20/56 382/104 |
| 2010/0245066 A1 | 9/2010 | Sarioglu et al. | |
| 2012/0062743 A1 | 3/2012 | Lynam et al. | |
| 2012/0218412 A1 | 8/2012 | Dellantoni et al. | |
| 2013/0222592 A1 | 8/2013 | Gieseke | |
| 2013/0297387 A1 * | 11/2013 | Michael | G06Q 30/02 705/13 |
| 2014/0218529 A1 | 8/2014 | Mahmoud et al. | |
| 2014/0375476 A1 | 12/2014 | Johnson et al. | |
| 2015/0124096 A1 | 5/2015 | Koravadi | |
| 2015/0158499 A1 | 6/2015 | Koravadi | |
| 2015/0251529 A1 | 9/2015 | Koravadi | |
| 2015/0352953 A1 | 12/2015 | Koravadi | |
| 2016/0036917 A1 | 2/2016 | Koravadi et al. | |
| 2016/0159394 A1 * | 6/2016 | Ryu | B62D 5/0493 701/41 |
| 2016/0210853 A1 | 7/2016 | Koravadi | |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0315231 A1 | 11/2017 | Wodrich | |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0173239 A1 * | 6/2018 | Yoon | G01S 17/89 |
| 2018/0231635 A1 | 8/2018 | Woehlte | |
| 2020/0327343 A1 * | 10/2020 | Lund | H04W 4/46 |
| 2021/0061276 A1 * | 3/2021 | Zhang | B60W 10/18 |
| 2021/0221390 A1 * | 7/2021 | Slobodyanyuk | G01S 7/40 |
| 2021/0385865 A1 * | 12/2021 | Mueck | H04W 74/0816 |
| 2021/0392454 A1 * | 12/2021 | Choi | H04L 5/0094 |
| 2022/0024485 A1 * | 1/2022 | Theverapperuma | G06V 10/77 |
| 2022/0097625 A1 * | 3/2022 | Russell | B60R 11/04 |
| 2022/0255223 A1 * | 8/2022 | Tran | H04L 67/535 |

* cited by examiner

VEHICULAR CONTROL SYSTEM WITH ENHANCED VEHICLE PASSING MANEUVERING

CROSS REFERENCE TO RELATED APPLICATION

The present application claims the filing benefits of U.S. provisional application Ser. No. 63/198,197, filed Oct. 2, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby herein by reference in their entireties. It is also known to provide a driving assistance system that assists in driving a vehicle along a road. Examples of such systems are described in U.S. Pat. Nos. 10,115,314; 9,682,712 and 6,842,687, and/or Indian Patent Application 201741046955, published as Publication No. 27/2019 on Jul. 5, 2019 for "A Method and System for Providing Overtaking Assistance," which are hereby incorporated herein by reference in their entireties.

SUMMARY OF THE INVENTION

Implementations herein provide a vehicular control system that includes a camera disposed at a vehicle equipped with the vehicular control system and viewing at least forward of the vehicle. The camera captures image data. The camera includes a CMOS imaging array with at least one million photosensors arranged in rows and columns. The system includes an electronic control unit (ECU) with electronic circuitry and associated software. The electronic circuitry of the ECU includes an image processor for processing image data captured by the camera to detect presence of an object viewed by the camera. The vehicular control system, as the equipped vehicle travels along a traffic lane of a road, and responsive to processing by the image processor of image data captured by the camera, determines presence of a leading vehicle ahead of the equipped vehicle and travelling in the same traffic lane as the equipped vehicle. The vehicular control system, via processing by the image processor of image data captured by the camera, determines a visual indication provided by the determined leading vehicle indicative of a safeness of a passing maneuver by the equipped vehicle. The visual indication is representative of a determination by the leading vehicle that the safeness of the passing maneuver exceeds a threshold safeness level. Based on the determined visual indication, the vehicular control system at least in part controls operation of the equipped vehicle to overtake and pass the determined leading vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a forward or rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
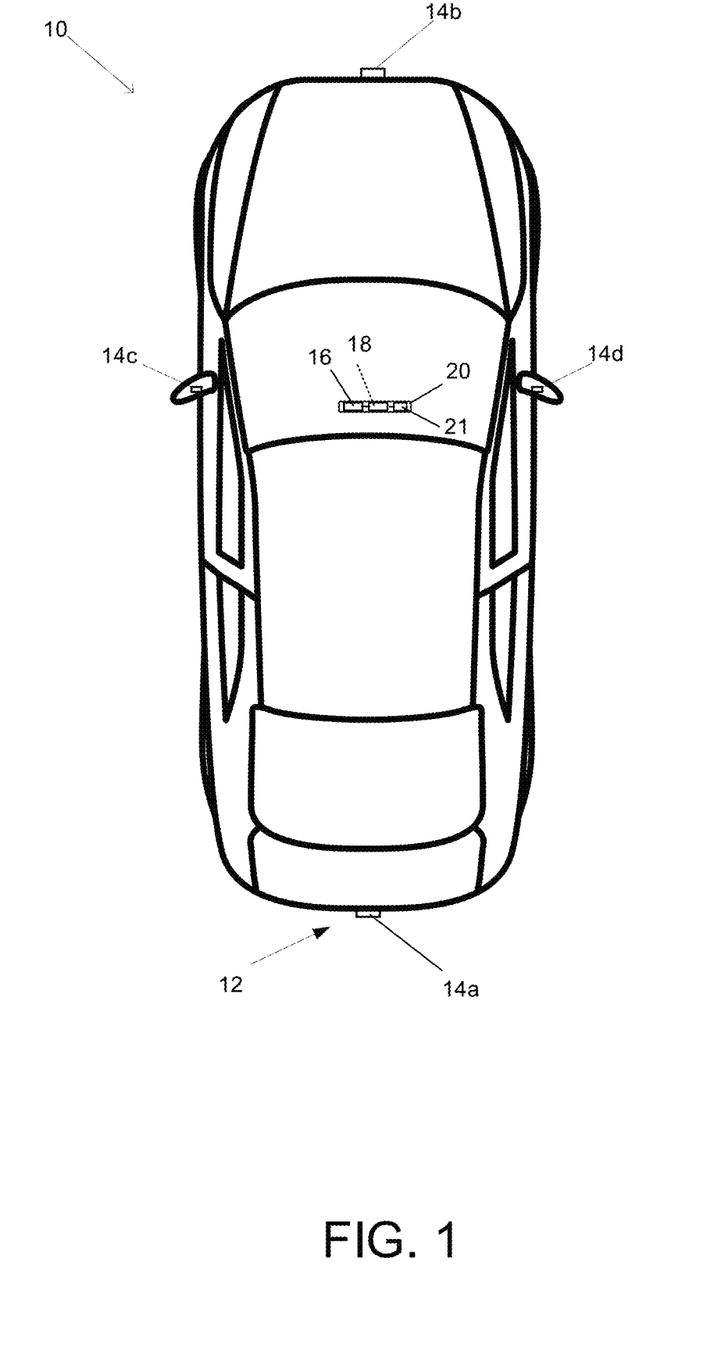
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. The vehicle includes a wireless communication module 21 in communication with the ECU. The wireless communication module is configured to wirelessly communicate with nearby vehicles via, for example, infrared, BLUETOOTH, WIFI, or any other wireless technologies.

An overtake is a driving maneuver when a trailing vehicle (the "overtaking vehicle") passes another vehicle (the "overtaken vehicle" or "the leading vehicle") travelling in front of and in the same direction as the overtaking vehicle, with the passing or overtaking vehicle passing the other or overtaken vehicle in an adjacent traffic lane that is for vehicles traveling in the opposite direction. Vehicle overtaking is one of the leading causes of accidents. Due to the dynamic nature of traffic, it is typically difficult, especially at high speeds, to obtain order in every traffic situation. However, overtaking is often necessary depending on factors such as a travel plan, speed of the surrounding vehicles, etc.

Typically, an overtake or overtaking maneuver or passing maneuver is a complicated maneuver because the destination of the overtaking vehicle is not visible (e.g., the leading vehicle blocks the view of the overtaking vehicle). Oncoming traffic and additional road elements such as humans and animals entering the road may not be visible to the overtaking vehicle. Implementations described herein relate to a vehicular vision system or driver assist system that automates the task of overtaking to avoid complicated movements made by human drivers in a moment of panic. The system uses sensors (e.g., cameras, radar, lidar, etc.) on a leading vehicle to detect road objects ahead and provide an indication of a safe overtake to an overtaking vehicle via vehicle-to-vehicle (V2V) communication.

The system may provide information on the oncoming road objects with V2V communication. Based on one or more forward-facing sensors (e.g. radar, one or more cameras, lidar, etc.), the leading vehicle determines the position and speed of any road objects and available space ahead of the leading vehicle and determines whether a safe overtake is possible or alternatively that an overtake would be unsafe. The leading vehicle may indicate an overtaking maneuver is safe when, for example, the leading vehicle does not detect an object (e.g., an oncoming vehicle) within a threshold distance of the leading vehicle. The safeness of the overtaking maneuver may be based on an amount of the road visible in front of the leading vehicle. For example, if a curve or hill obscures a portion of the view of the leading vehicle such that the leading vehicle cannot determine whether an object is present within the threshold distance, the leading vehicle may indicate that the overtaking maneuver is unsafe.

The leading vehicle may indicate the safety level of an overtake via a visual indication to the trailing vehicle (i.e., the overtaking vehicle). For example, the visual indication may include an LED matrix array (e.g., of a turn signal, a brake light, or other rear facing or rearward emitting light) showing a QR-Code (or other identifiable indication such as, e.g., a symbol, pattern, blinking lights, etc.) that a camera or a driver of the overtaking vehicle receives and interprets. When overtaking is safe, the vehicle may provide a first visual indication, and the system may provide a second different visual indication when overtaking is not safe. Alternatively, the leading vehicle may provide a visual indication when overtaking is safe and no visual indication when overtaking is not safe (or vice versa). When a camera or other image sensor of the overtaking vehicle detects the visual indication, the overtaking vehicle may provide a visual or audible alert to the driver of the vehicle that is indicative of the safety level of the overtaking maneuver at that time. For example, the vehicle may display an alert on a display within the vehicle that an overtaking maneuver would be safe/unsafe. The overtaking vehicle may provide an indication to the leading vehicle of the overtaking maneuver, and in turn the leading vehicle (that is being overtaken) may provide an indication (e.g., visual, audible) of the overtake maneuver to the driver of the leading vehicle.

Optionally, a local vehicular network enables the transmission of the position, speed, and orientation of any oncoming road objects from the leading vehicle to the overtaking vehicle. Optionally, the same local vehicular network may communicate the safety of the overtaking maneuver (i.e., instead of or in addition to the visual indication). The local vehicular network may be established via any conventional wireless technologies such as WIFI, BLUETOOTH, infrared, a cellular data connection, and other V2V communication technologies.

Based on the indication provided (such as visually indicated or wirelessly transmitted) by the leading vehicle and the intent of the driver of the overtaking vehicle, the overtaking maneuver may be performed autonomously using automatic lane change assistance, distance estimation, trajectory planning and other self-driving methods. For example, the driver may indicate an intent to overtake by actuating a user input (e.g., interacting with a touch screen, pressing a button, enabling a turn signal, etc.) within the vehicle and/or providing a verbal command. In autonomous vehicles, this intent may be obtained from a decision-making unit. The safest and riskiest overtaking possibilities are determined by an accuracy of the indication from the leading vehicle and the traffic dynamic. Accounting for curves, turns, road conditions, and visibility data improves the quality of the function.

Figure 2:
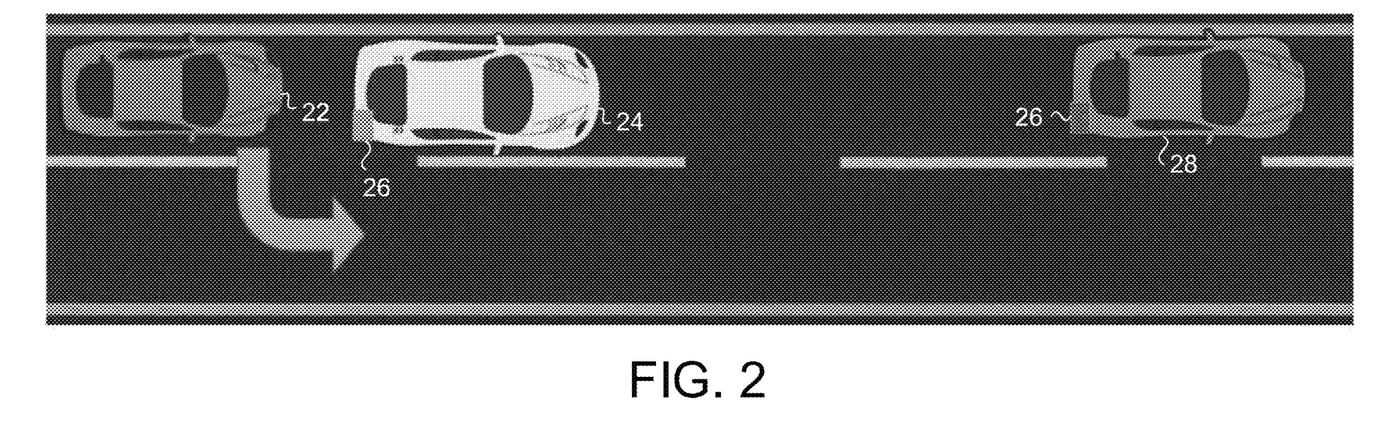
FIG. 2 is a plan view of a vehicle receiving a visual indication that an overtaking maneuver is safe.

Referring now to FIG. 2, when the driver of an overtaking vehicle 22 selects the autonomous overtake option to overtake a leading vehicle 24, the overtaking vehicle may wait for communication from the leading vehicle ahead that an overtake is possible and/or safe (e.g., via a visual indication 26 and/or via V2V communication between the leading vehicle and the overtaking vehicle). The option to overtake may only be presented to the driver of the overtaking vehicle when a safety of the maneuver exceeds a threshold level. That is, the leading vehicle may communicate to the overtaking vehicle that an overtake is sufficiently safe and subsequently the trailing vehicle may present an overtaking option (e.g., via a display) the option to overtake the leading vehicle. The overtaking vehicle 22 may only indicate that overtaking is safe when, for example sufficient distance exists between the leading vehicle 24 and a preceding vehicle 28.

Figure 3:
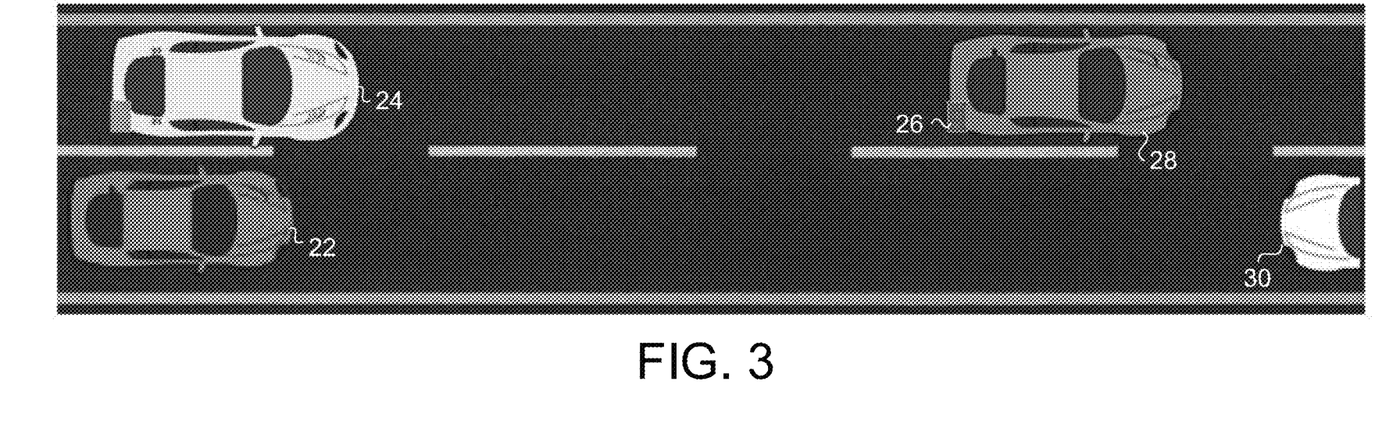
FIG. 3 is a plan view of the vehicle of FIG. 2 beginning the overtaking maneuver.

Referring now to FIG. 3, responsive to receiving the indication that overtaking is safe, the overtaking vehicle 22 moves into a neighboring lane using, for example, an automatic lane change assistance function and obtains a view of the road ahead of the leading vehicle 24. Optionally, the indication that overtaking is safe may only be provided when any oncoming objects 30 are at a sufficient distance from the leading vehicle 24 based on the speed of the leading vehicle 24 and/or the speed of the oncoming object 30. Here, the leading vehicle 24 determines that the oncoming object (i.e., oncoming vehicle 30) is a sufficient distance away from the leading vehicle 24 at its current speed to not impact the safety of the overtaking maneuver. Similarly, the preceding vehicle 28 here may provide an indication 26 that overtaking is safe or not safe due to the proximity and approach speed of the oncoming object 30.

Figure 4:
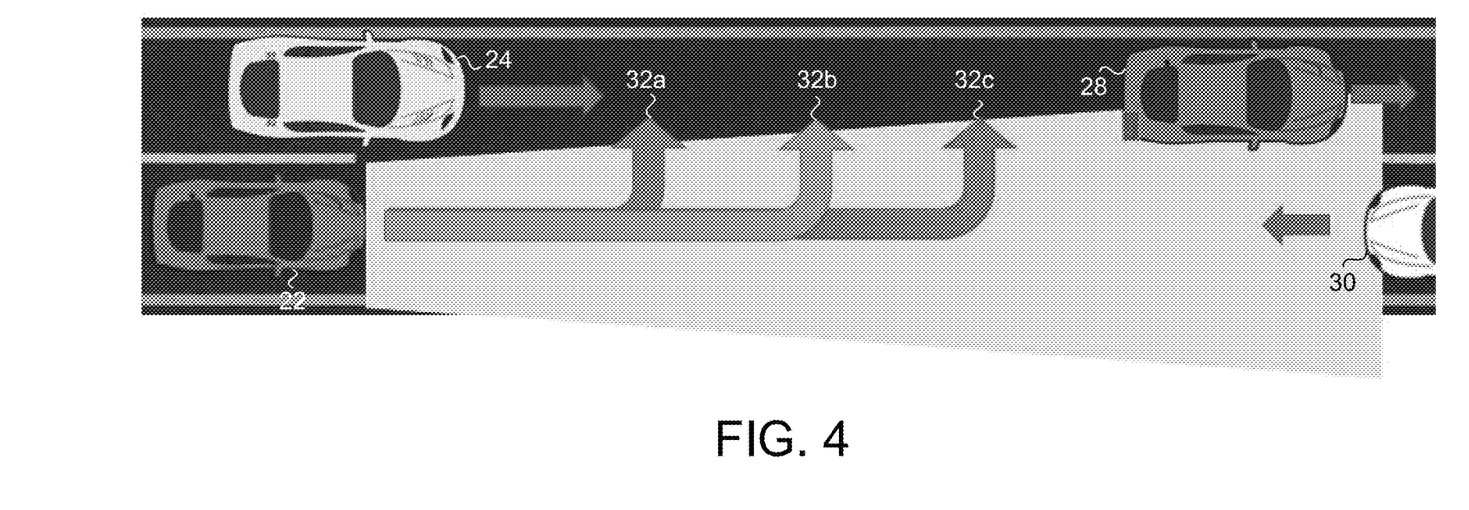
FIG. 4 is a plan view of the vehicle of FIG. 3 determining a plurality of potential destinations.

Referring now to FIG. 4, the overtaking vehicle 22 uses one or more sensors (e.g., radar, camera(s), lidar, etc.) to determine the relative position and velocities of the various road objects in front of the vehicle. This may provide redundant information already provided by leading vehicle 24 to provide additional safety. The system determines one or more potential destinations of the overtake maneuver, the trajectory necessary to arrive at each destination, and a safety determination of each trajectory. Here, the system determines three potential destinations, 32a, 32b, 32c ahead of the leading vehicle 24. The number of potential destinations may be dependent upon the amount of available space ahead of the leading vehicle 24, a size of the overtaking vehicle 22, and/or a speed of the vehicles and/or relative speed of the overtaking vehicle relative to the vehicle being overtaken and passed. For example, when there are no other vehicles in front of the leading vehicle 24, a greater number of potential destinations may be valid as compared to when there is another vehicle in front of the leading vehicle 24. The safety of the potential destination may also depend on the distance between the potential destination and the leading vehicle 24. For example, a potential destination 32a that requires the overtaking vehicle 22 to pull directly in front of the leading vehicle 24 may be less safe than a potential destination that provides more margin or gap ahead of the leading vehicle.

The safety of each potential destination 32a, 32b, 32c may be based at least in part on oncoming objects (e.g., vehicles). For example, because the destination 32c is farther away and will require a longer time in the oncoming traffic lane, the destination 32c may be less safe than the other two potential destinations 32a, 32b. The system also determines the trajectories (i.e., the speed, the acceleration, the steering angles, etc.) necessary to arrive at each potential destination. The safety of each potential destination may be based in part on the required trajectory. For example, a trajectory that requires greater acceleration or sharper steering may be less safe than trajectories that requires less acceleration or gentler steering. The system may select the safest potential destination out of all of the potential destinations.

Optionally, during the overtaking maneuver, the overtaking vehicle 22 may maintain continuous communication with the leading vehicle 24 regarding information on the obstacles ahead of the leading vehicle 24. When the leading vehicle 24 is operating autonomously or semi-autonomously, the leading vehicle 24 may attempt to maintain a distance or gap between any vehicles (e.g., vehicle 28) in front of the leading vehicle to maintain a safe destination for the overtaking vehicle 24. When the leading vehicle 24 is being operated by a driver, the leading vehicle 24 may display a notice or other alert in the cabin of the vehicle requesting the driver of the leading vehicle to maintain the gap.

Figure 5:
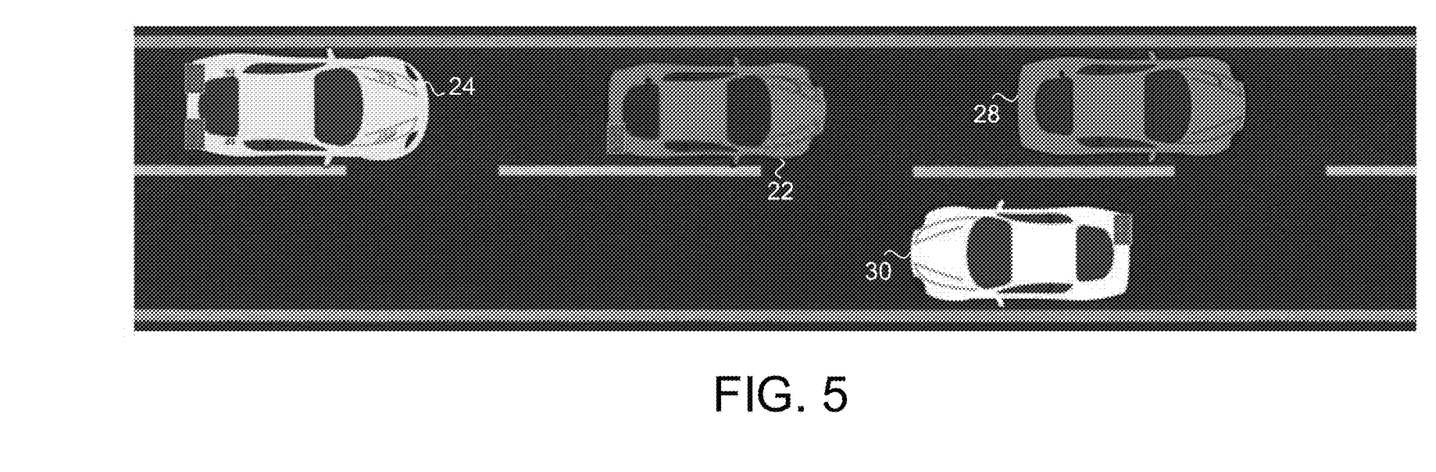
FIG. 5 is a plan view of the vehicle of FIG. 4 arriving at the selected destination after the overtaking maneuver.

Referring now to FIG. 5, the overtaking vehicle 22 executes the trajectory of the safest overtake destination. That is, the system operates the steering, acceleration, and braking of the vehicle to overtake the leading vehicle 24 and follow the selected trajectory to arrive at the selected destination ahead of the leading vehicle 24. While overtaking, the leading vehicle 24 may continue to monitor and maintain the space ahead for the overtaking vehicle to enter.

Thus, the vehicular vision system or driver assist system provides safe overtaking maneuvering by receiving a visual and/or wireless communication from a leading vehicle regarding a level of safety of an overtaking maneuver. When the leading vehicle indicates, based on sensor data regarding objects in front of the leading vehicle, that overtaking is safe, the equipped vehicle autonomously initiates an overtaking maneuver. The overtaking vehicle and the leading vehicle may communicate via visual indications and/or via V2V communication. The leading vehicle may provide the overtaking vehicle with information regarding objects detected in front of the overtaking vehicle. The overtaking vehicle, during the overtaking maneuver may determine a plurality of potential destinations and select the destination that is the safest.

For autonomous vehicles suitable for deployment with the systems described herein, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:
   a camera disposed at a vehicle equipped with the vehicular control system and viewing at least forward of the vehicle, the camera capturing image data;
   wherein the camera comprises a CMOS imaging array, and wherein the CMOS imaging array comprises at least one million photosensors arranged in rows and columns;
   an electronic control unit (ECU) comprising electronic circuitry and associated software;
   wherein the electronic circuitry of the ECU comprises an image processor for processing image data captured by the camera to detect presence of an object viewed by the camera;
   wherein the vehicular control system, as the equipped vehicle travels along a traffic lane of a road, and responsive to processing by the image processor of image data captured by the camera, determines presence of a leading vehicle ahead of the equipped vehicle and travelling in the same traffic lane as the equipped vehicle;
   wherein the vehicular control system, via processing by the image processor of image data captured by the camera, determines a visual indication provided by the determined leading vehicle indicative of a safeness of a passing maneuver by the equipped vehicle, wherein the visual indication is representative of a determination by the leading vehicle that the safeness of the passing maneuver exceeds a threshold safeness level; and
   wherein based on the determined visual indication, the vehicular control system at least in part controls operation of the equipped vehicle to overtake and pass the determined leading vehicle.

2. The vehicular control system of claim 1, wherein the visual indication comprises a QR code displayed by an LED matrix of the determined leading vehicle.

3. The vehicular control system of claim 1, wherein the visual indication originates from a turn signal light or a brake light of the determined leading vehicle.

4. The vehicular control system of claim 1, wherein the vehicular control system receives, via V2V communication with the determined leading vehicle, information regarding obstacles ahead of the determined leading vehicle.

5. The vehicular control system of claim 1, wherein the vehicular control system performs the passing maneuver at least in part based on actuation of a user input by an occupant of the equipped vehicle.

6. The vehicular control system of claim 1, wherein the vehicular control system performs the passing maneuver to pass the determined leading vehicle by controlling steering, acceleration, and braking of the equipped vehicle.

7. The vehicular control system of claim 1, wherein the determined visual indication is based on the presence and speed of objects in front of the determined leading vehicle.

8. The vehicular control system of claim 1, wherein the determined leading vehicle, during the passing maneuver by the equipped vehicle, maintains a gap between the determined leading vehicle and a third vehicle in front of the determined leading vehicle.

9. A vehicular control system, the vehicular control system comprising:
a camera disposed at a vehicle equipped with the vehicular control system and viewing at least forward of the vehicle, the camera capturing image data;
wherein the camera comprises a CMOS imaging array, and wherein the CMOS imaging array comprises at least one million photosensors arranged in rows and columns;
an electronic control unit (ECU) comprising electronic circuitry and associated software;
wherein the electronic circuitry of the ECU comprises an image processor for processing image data captured by the camera to detect presence of an object viewed by the camera;
wherein the vehicular control system, as the equipped vehicle travels along a traffic lane of a road, and responsive to processing by the image processor of image data captured by the camera, determines presence of a leading vehicle ahead of the equipped vehicle and travelling in the same traffic lane as the equipped vehicle;
wherein the vehicular control system, via processing by the image processor of image data captured by the camera, determines a visual indication provided by the determined leading vehicle indicative of a safeness of a passing maneuver by the equipped vehicle, wherein the visual indication is representative of a determination by the leading vehicle that the safeness of the passing maneuver exceeds a threshold safeness level;
wherein based on the determined visual indication, the vehicular control system at least in part controls operation of the equipped vehicle to overtake and pass the determined leading vehicle; and
wherein the vehicular control system, during the passing maneuver, determines at least one potential destination that is ahead of the leading vehicle, and wherein the vehicular control system at least in part controls operation of the equipped vehicle to overtake and pass the determined leading vehicle based in part on the at least one potential destination.

10. The vehicular control system of claim 9, wherein the vehicular control system, during the passing maneuver, determines a plurality of potential destinations ahead of the determined leading vehicle, and wherein the vehicular control system determines an amount of safety of each potential destination of the plurality of potential destinations, and wherein the vehicular control system controls operation of the equipped vehicle to overtake and pass the determined leading vehicle based in part on one of the plurality of potential destinations that has a greater amount of safety compared to others of the plurality of potential destinations.

11. The vehicular control system of claim 10, wherein the vehicular control system determines a corresponding trajectory for each of the plurality of potential destinations, and wherein the amount of safety of each potential destination of the plurality of potential destinations is based in part on the corresponding trajectory.

12. A vehicular control system, the vehicular control system comprising:
a camera disposed at a vehicle equipped with the vehicular control system and viewing at least forward of the vehicle, the camera capturing image data;
wherein the camera comprises a CMOS imaging array, and wherein the CMOS imaging array comprises at least one million photosensors arranged in rows and columns;
an electronic control unit (ECU) comprising electronic circuitry and associated software;
wherein the electronic circuitry of the ECU comprises an image processor for processing image data captured by the camera to detect presence of an object viewed by the camera;
wherein the vehicular control system, as the equipped vehicle travels along a traffic lane of a road, and responsive to processing by the image processor of image data captured by the camera, determines a safeness of a passing maneuver for another vehicle to pass and overtake the equipped vehicle;
wherein the vehicular control system, responsive to determining the safeness of the passing maneuver exceeding a threshold safeness level, indicates, to a trailing vehicle rearward of the equipped vehicle, the safeness of the passing maneuver; and
wherein the indication to the trailing vehicle rearward of the equipped vehicle comprises a visual indication that originates from a turn signal light or a brake light of the determined leading vehicle.

13. The vehicular control system of claim 12, wherein the vehicular control system transmits, via V2V communication with the trailing vehicle rearward of the equipped vehicle, information regarding obstacles ahead of the equipped vehicle.

14. The vehicular control system of claim 12, wherein the indication to the trailing vehicle rearward of the equipped vehicle comprises a visual indication.

15. The vehicular control system of claim 12, wherein the vehicular control system, responsive to determining the safeness of the passing maneuver fails to exceed the threshold safeness level, indicates, to the trailing vehicle rearward of the equipped vehicle, the safeness of the passing maneuver.

16. The vehicular control system of claim 12, wherein the vehicular control system determines the safeness of the passing maneuver for the trailing vehicle based on traffic traveling on the road, speed of the equipped vehicle, and speed of the trailing vehicle relative to the equipped vehicle.

17. A vehicular control system, the vehicular control system comprising:
a camera disposed at a vehicle equipped with the vehicular control system and viewing at least forward of the vehicle, the camera capturing image data;
wherein the camera comprises a CMOS imaging array, and wherein the CMOS imaging array comprises at least one million photosensors arranged in rows and columns;

an electronic control unit (ECU) comprising electronic circuitry and associated software;

wherein the electronic circuitry of the ECU comprises an image processor for processing image data captured by the camera to detect presence of an object viewed by the camera;

wherein the vehicular control system, as the equipped vehicle travels along a traffic lane of a road, and responsive to processing by the image processor of image data captured by the camera, determines presence of a leading vehicle ahead of the equipped vehicle and travelling in the same traffic lane as the equipped vehicle;

wherein the leading vehicle is equipped with another ECU, which is operable to determine a safeness of a passing maneuver for the equipped vehicle based on traffic traveling on the road, speed of the leading vehicle, and speed of the equipped vehicle relative to the leading vehicle;

wherein the leading vehicle provides an indication indicative of the safeness of the passing maneuver by the equipped vehicle, wherein the indication is representative of a determination by the leading vehicle that the safeness of the passing maneuver exceeds a threshold safeness level;

wherein the vehicular control system determines the indication provided by the determined leading vehicle indicative of the safeness of the passing maneuver by the equipped vehicle; and wherein based on the determined indication, the vehicular control system at least in part controls operation of the equipped vehicle to overtake and pass the determined leading vehicle.

18. A vehicular control system, the vehicular control system comprising:

a camera disposed at a vehicle equipped with the vehicular control system and viewing at least forward of the vehicle, the camera capturing image data;

wherein the camera comprises a CMOS imaging array, and wherein the CMOS imaging array comprises at least one million photosensors arranged in rows and columns;

an electronic control unit (ECU) comprising electronic circuitry and associated software;

wherein the electronic circuitry of the ECU comprises an image processor for processing image data captured by the camera to detect presence of an object viewed by the camera;

wherein the vehicular control system, as the equipped vehicle travels along a traffic lane of a road, and responsive to processing by the image processor of image data captured by the camera, determines presence of a leading vehicle ahead of the equipped vehicle and travelling in the same traffic lane as the equipped vehicle;

wherein the leading vehicle is equipped with another ECU, which is operable to determine a safeness of a passing maneuver for the equipped vehicle based on traffic traveling on the road, speed of the leading vehicle, and speed of the equipped vehicle relative to the leading vehicle;

wherein the leading vehicle provides an indication indicative of the safeness of the passing maneuver by the equipped vehicle, wherein the indication is representative of a determination by the leading vehicle that the safeness of the passing maneuver exceeds a threshold safeness level;

wherein the vehicular control system determines the indication provided by the determined leading vehicle indicative of the safeness of the passing maneuver by the equipped vehicle;

wherein based on the determined indication, the vehicular control system at least in part controls operation of the equipped vehicle to overtake and pass the determined leading vehicle; and wherein the vehicular control system, during the passing maneuver, determines at least one potential destination that is ahead of the leading vehicle, and wherein the vehicular control system at least in part controls operation of the equipped vehicle to overtake and pass the determined leading vehicle based in part on the at least one potential destination.

19. The vehicular control system of claimer 18, wherein the vehicular control system, during the passing maneuver, determines a plurality of potential destinations ahead of the determined leading vehicle, and wherein the vehicular control system determines an amount of safety of each potential destination of the plurality of potential destinations, and wherein the vehicular control system controls operation of the equipped vehicle to overtake and pass the determined leading vehicle based in part on one of the plurality of potential destinations that has a greater amount of safety compared to others of the plurality of potential destinations.

20. The vehicular control system of claim 19, wherein the vehicular control system wirelessly receives the indication provided by the leading vehicle indicative of the safeness of the passing maneuver by the equipped vehicle.

\* \* \* \* \*

UNITED STATES PATENT AND TRADEMARK OFFICE
CERTIFICATE OF CORRECTION

PATENT NO. : 12,030,501 B2
APPLICATION NO. : 17/449539
DATED : July 9, 2024
INVENTOR(S) : Martin Solar et al.

Page 1 of 1

It is certified that error appears in the above-identified patent and that said Letters Patent is hereby corrected as shown below:

In the Claims

<u>Column 12</u>
Claim 19, Line 33, "claimer 18" should be --claim 18--

Signed and Sealed this
Sixth Day of August, 2024

Katherine Kelly Vidal
*Director of the United States Patent and Trademark Office*